(12) United States Patent
Sanguineti et al.

(10) Patent No.: US 11,292,904 B2
(45) Date of Patent: Apr. 5, 2022

(54) COMPOSITION CONTAINING FLUORINATED THERMOPLASTIC ELASTOMERS AND VULCANIZATES

(71) Applicant: SOLVAY SPECIALTY POLYMERS ITALY S.P.A., Bollate (IT)

(72) Inventors: Aldo Sanguineti, Milan (IT); Marco Mirenda, Rho (IT); Satchit Srinivasan, Dallas, TX (US)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 278 days.

(21) Appl. No.: 16/628,659

(22) PCT Filed: Jun. 25, 2018

(86) PCT No.: PCT/EP2018/066903
§ 371 (c)(1),
(2) Date: Jan. 3, 2020

(87) PCT Pub. No.: WO2019/007728
PCT Pub. Date: Jan. 10, 2019

(65) Prior Publication Data
US 2020/0216654 A1 Jul. 9, 2020

(30) Foreign Application Priority Data
Jul. 5, 2017 (EP) ..................... 17179708

(51) Int. Cl.
*C08L 27/16* (2006.01)
*C08J 3/20* (2006.01)
*C08L 27/20* (2006.01)
*C08L 53/00* (2006.01)

(52) U.S. Cl.
CPC ............... *C08L 27/16* (2013.01); *C08J 3/201* (2013.01); *C08L 27/20* (2013.01); *C08L 53/00* (2013.01); *C08L 2205/025* (2013.01); *C08L 2205/03* (2013.01); *C08L 2207/04* (2013.01); *C08L 2312/00* (2013.01)

(58) Field of Classification Search
CPC ....................................... C08L 27/16
See application file for complete search history.

(56) References Cited

U.S. PATENT DOCUMENTS

| 7,449,524 B2 | 11/2008 | Park et al. | |
|---|---|---|---|
| 2006/0148954 A1* | 7/2006 | Park | C08L 27/12 524/433 |
| 2008/0032080 A1 | 2/2008 | Faulkner et al. | |
| 2009/0011164 A1* | 1/2009 | Masuda | C08L 53/00 428/36.92 |
| 2009/0202769 A1* | 8/2009 | Masuda | F16J 15/102 428/36.92 |

FOREIGN PATENT DOCUMENTS

| EP | 661304 A1 | 7/1995 |
|---|---|---|
| EP | 924257 A1 | 6/1999 |
| JP | 2007191576 A2 | 8/2007 |
| WO | 97047683 A1 | 12/1997 |
| WO | 2009065895 A1 | 5/2009 |
| WO | 2015014698 A1 | 2/2015 |
| WO | 2015014699 A1 | 2/2015 |

OTHER PUBLICATIONS

Standard ASTM D3418-08, "Standard Test Method for Transition Temperatures and Enthalpies of Fusion and Crystallization of Polymers by Differential Scanning Calorimetry", 2008, p. 1-7.

* cited by examiner

*Primary Examiner* — Mark S Kaucher
(74) *Attorney, Agent, or Firm* — Osha Bergman Watanabe & Burton LLP

(57) ABSTRACT

The present invention relates to new fluorinated thermoplastic elastomer compositions comprising a continuous thermoplastic fluorocarbon polymer phase and a dispersed vulcanized fluorine-containing elastomer phase having improved thermal processability.

20 Claims, No Drawings

COMPOSITION CONTAINING FLUORINATED THERMOPLASTIC ELASTOMERS AND VULCANIZATES

CROSS-REFERENCE TO RELATED APPLICATIONS

This application is a U.S. national stage entry under 35 U.S.C. § 371 of International Application No. PCT/EP2018/066903 filed Jun. 25, 2018, which claims priority to European application No. 17179708.7, filed on Jul. 5, 2017. The entire contents of these applications are explicitly incorporated herein by this reference.

TECHNICAL FIELD

The present invention relates to fluoropolymer compositions possessing advantageous mechanical properties, including improved recovery and being characterized by improved softness and improved thermal processability.

The present invention also relates to a method for manufacturing said composition and to articles manufactured from said composition.

BACKGROUND ART

Two-phase compositions comprising a continuous phase thermoplastic material and a disperse phase elastomer, produced by dynamically vulcanizing the elastomer while the dispersed phase elastomer is mixed under shear in the continuous thermoplastic material kept in the molten state, are well known in the art and often referred to as thermoplastic vulcanizates (TPV).

Because of advantageous properties of fluorine-containing materials, TPV including both thermoplastic fluorinated polymer continuous phase and fluorine-containing elastomer dispersed phase have attracted great deal of attention for providing high level of chemical resistance with the advantages of thermoplastic processability.

It is nevertheless well known that a wide variety of fluorine-containing TPVs require additional additives during the preparation or require crosslinking post treatments in order to improve the compatibilization of the components.

Patent document U.S. Pat. No. 7,449,524 (FREUDENBERG-NOK General Partnership) Jun. 7, 2006 discloses the dynamic vulcanization of a curable fluorocarbon elastomer in the presence of a major amount of a non-curing thermoplastic material and a minor amount of an elastomer that does not cure under the dynamic vulcanization conditions. The non-curing elastomer is added to the composition as processing aid, with the aim of lowering the melt viscosity and, consequently, the injection molding pressure.

Patent document EP0906368 (RAYCHEM CORP) 18 Dec. 1997, describes compositions comprising ethylene-tetrafluoroethylene (ETFE), a fluoroplastic terpolymer of vinylidene fluoride (VDF), hexafluoropropylene (HFP) and tetrafluoroethylene (TFE) and a block fluorinated thermoplastic elastomer. After processing, the whole of the obtained rubber/plastic composition must still be crosslinked by ionizing radiation (typically from electron beams) in order to achieve good properties. As a result, the composition cannot be melt-molded and recycled any more.

Patent document US 2008/0032080 (DAIKIN AMERICA INC.) Jun. 1, 2006 discloses the addition of block terpolymers of TFE/HFP/VDF as compatibilizing agent during the dynamic vulcanization for the preparation of a TPV comprising ETFE and a fluoroelastomer.

However, a shortcoming of such block copolymers is that mechanical and elastic properties quickly get worse when raising temperature. In particular compression set values are high, such as to make them unsuitable as additives in the preparation of TPV products for use, as an example, in sealing elements to be used at high temperatures, as required by automotive and plant engineering industry.

It would be advantageous to obtain fluorinated thermoplastic vulcanizate compositions with improved processing properties associated with improved mechanical properties, improved recovery in particular.

SUMMARY OF INVENTION

The Applicant has now surprisingly found that certain fluorinated thermoplastic vulcanizate compositions, as below detailed, are such to address and cope the needs expressed above.

Relying on a blending method at a temperature which is above the melting temperature of all the crystalline phases in the composition, the Applicant has been able to provide certain TPV compositions including certain uncured fluorinated thermoplastic elastomers (F-TPE) consisting of at least one elastomeric segment and at least one thermoplastic segment, wherein both the thermoplastic resin of the TPV and the thermoplastic segment of the TPE consist of sequences of recurring units derived from VDF.

The present invention hence is directed, in a first aspect, to a fluoropolymer composition (FC) comprising:

- a thermoplastic vulcanizate fluorine-containing composition [vulcanizate (C)], comprising a continuous thermoplastic fluoropolymer phase and a dispersed vulcanized fluoroelastomer phase, said composition comprising:
- a fluoroelastomer [elastomer (a1)] consisting of a sequence of recurring units, said sequence comprising recurring units derived from VDF and recurring units derived from at least one fluorinated monomer different from VDF [monomer (FM)], wherein at least part of said elastomer (a1) is chemically crosslinked; and
- at least one thermoplastic VDF polymer [polymer (a2)] comprising recurring units derived from VDF in an amount of at least 85% moles, with respect to the total moles of recurring units of polymer (a2); and
- at least one fluorinated thermoplastic elastomer [polymer (F-TPE)] comprising:
- at least one elastomeric block (b1) consisting of a sequence of recurring units, said sequence comprising recurring units derived from VDF and recurring units derived from at least one fluorinated monomer different from VDF [monomer (FM1)], and
- at least one thermoplastic block (b2) consisting of a sequence of recurring units, said sequence comprising recurring units derived from VDF in an amount of at least 85% moles, with respect to the total moles of recurring units of block (b2).

The Applicant has surprisingly found that in the fluoropolymer composition (FC) in its solid state, the thermoplastic resin (polymer (a2)) in the vulcanizate (C) forms a single crystalline phase with the thermoplastic segment of the fluorinated thermoplastic elastomer (block (b2)), thus creating a stable physical network that retains excellent elastomeric properties.

In addition, the Applicant found that, advantageously, the fluoropolymer composition (FC) is improved in softness.

The applicant has also surprisingly found that during the blending in the molten state, the addition of the uncured polymer (F-TPE) to the vulcanizate (C) improves the processability of the thermoplastic vulcanizate, being free from any covalent crosslinking junction.

The invention further pertains to a method for manufacturing the fluoropolymer composition (FC) as above detailed, said method advantageously generally including at least one step of mixing vulcanizate (C) and polymer (F-TPE) in the molten form

DESCRIPTION OF EMBODIMENTS

The Thermoplastic Vulcanizate Fluorine-Containing Composition [Vulcanizate (C)]

Polymer (a2) is a thermoplastic, that is to say a polymer which softens on heating and hardens on cooling at room temperature, which at room temperature exists below its glass transition temperature if fully amorphous or below its melting point if semi-crystalline.

It is nevertheless generally preferred for the polymer (a2) to be semi-crystalline, which is to say to have a definite melting point; preferred polymers (a2) are those possessing a heat of fusion ($\Delta H_f$) of at least 25 J/g, when determined by DSC according to ASTM D3418. Without upper limit for heat of fusion being critical, it is nevertheless understood that polymer (a2) will generally possess a heat of fusion of at most 55 J/g, preferably of at most 53 J/g, more preferably of at most 50 J/g.

Polymer (a2) may comprise recurring units derived from one or more than one fluorinated monomers different from VDF [monomer (F)].

In the rest of the text, the expression "fluorinated monomers" is understood, for the purposes of the present invention, both in the plural and the singular, that is to say that they denote both one or more than one fluorinated monomers as defined above.

The at least one monomer (F) can be present in an amount of from 0.1% to 15% by moles, preferably from 0.1% to 12% by moles, more preferably from 0.1% to 10% by moles, all the aforementioned % by moles being referred to the total moles of recurring units of the polymer (a2).

Said monomer (F) is generally selected from the group consisting of:

(a) $C_2$-$C_8$ perfluoroolefins, such as tetrafluoroethylene (TFE), and hexafluoropropene (HFP);

(b) $C_2$-$C_8$ hydrogenated fluoroolefins, such as vinyl fluoride (VF1), 1,2-difluoroethylene, VDF and trifluoroethylene (TrFE);

(c) perfluoroalkylethylenes complying with formula $CH_2=CH-R_{f0}$, in which $R_{f0}$ is a $C_1$-$C_6$ perfluoroalkyl;

(d) chloro- and/or bromo- and/or iodo-$C_2$-$C_6$ fluoroolefins, like chlorotrifluoroethylene (CTFE);

(e) (per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

(f) $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(g) (per)fluoroalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like —$C_2F_5$—O—$CF_3$;

(h) functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

(i) fluorodioxoles, of formula (I):

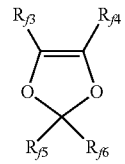

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

Said monomer (F) is advantageously selected from VF1, CTFE, HFP, TFE, TrFE and perfluoromethylvinylether (PMVE).

As non-limitative examples of polymers (a2) useful in the present invention, mention can be notably made of homopolymers of VDF, VDF/TFE copolymers, VDF/CTFE copolymers and the like.

VDF homopolymers are particularly advantageous for being used as polymer (a2) in the vulcanizate (C).

The polymer (a2) is typically obtainable by emulsion polymerization or suspension polymerization.

The melt index of the polymer (a2) is advantageously at least 1, preferably at least 2, more preferably at least 5 g/10 min and advantageously less than 70, preferably less than 50, more preferably less than 40 g/10 min, when measured in accordance with ASTM test No. 1238, run at 230° C., under a piston load of 5 kg.

The polymer (a2) has advantageously a melting point (Tm2) advantageously of at least 120° C., preferably at least 125° C., more preferably at least 130° C. and of at most 300° C., preferably at most 250° C., more preferably at most 190° C., when determined by DSC, at a heating rate of 10° C./min, according to ASTM D 3418.

For the purposes of this invention, the term "fluoroelastomer" [elastomer (a1)] is intended to designate a VDF-based copolymer, which consists of a sequence of recurring units, said sequence comprising recurring units derived from VDF and recurring units derived from at least one monomer (FM), wherein the fluorinated monomer (FM) is selected from the following classes:

(A1) $C_2$-$C_8$ perfluoroolefins, such as TFE, HFP, hexafluoroisobutylene;

(B1) hydrogen-containing $C_2$-$C_8$ olefins, such as $C_2$-$C_8$ non-fluorinated olefins (Ol); $C_2$-$C_8$ partially fluorinated olefins, VF1, TrFE, perfluoroalkyl ethylenes of formula $CH_2=CH-R_f$, wherein $R_f$ is a $C_1$-$C_6$ perfluoroalkyl group;

($C_1$) $C_2$-$C_8$ chloro and/or bromo and/or iodo-fluoroolefins such as CTFE;

(D1) (per)fluoroalkylvinylethers of formula $CF_2=CFOR_f$, wherein $R_f$ is a $C_1$-$C_6$ (per)fluoroalkyl group; preferably perfluoroalkylvinylethers (PAVE) of above formula wherein $R_f$ is $C_1$-$C_6$ perfluoroalkyl group, e.g. $CF_3$, $C_2F_5$, $C_3F_7$;

(E1) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;

(F1) (per)fluorodioxoles having formula:

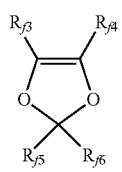

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(G1) (per)fluoro-methoxy-vinylethers (MOVE, hereinafter) having formula:

$$CFX^2=CX^2OCF_2OR''_f$$

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X^2$=F, H; preferably $X^2$ is F and $R''_f$ is —$CF_2CF_3$ (MOVE1); —$CF_2CF_2OCF_3$ (MOVE2); or —$CF_3$ (MOVE3);

(H1) $C_2$-$C_8$ non-fluorinated olefins (Ol), for example ethylene and propylene.

Most preferred elastomers (a1) are those having following compositions (in mol %):

(i) VDF 35-85%, HFP 10-45%, TFE 0-30%, PAVE 0-15%;
(ii) VDF 50-80%, PAVE 5-50%, TFE 0-20%;
(iii) VDF 20-30%, $C_2$-$C_8$ non-fluorinated olefins (Ol) 10-30%, HFP and/or PAVE 18-27%, TFE 10-30%;
(iv) TFE 33-75%, PAVE 15-45%, VDF 5-30%, HFP 0-30%;
(v) VDF 35-85%, MOVE 5-40%, PAVE 0-30%, TFE 0-40%, HFP 0-30%.

Optionally, elastomer (a1) of the present invention also comprises recurring units derived from a bis-olefin [bis-olefin (OF)] having general formula:

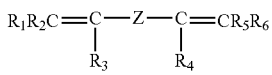

wherein $R_1$, $R_2$, $R_3$, $R_4$, $R_5$ and $R_6$, equal to or different from each other, are H, halogen, a group $R_{Alk}$ or $OR_{Alk}$, wherein $R_{Alk}$ is a branched or straight chain alkyl radical which can be partially, substantially or completely fluorinated or chlorinated; Z is a linear or branched $C_1$-$C_{18}$ alkylene or cycloalkylene radical, optionally containing oxygen atoms, preferably at least partially fluorinated, or a (per)fluoropolyoxyalkylene radical, e.g. as described in EP 661304 A (AUSIMONT SPA) Jul. 5, 1995.

The bis-olefin (OF) is preferably selected from the group consisting of those complying with formulae (OF-1), (OF-2) and (OF-3):

(OF-1)

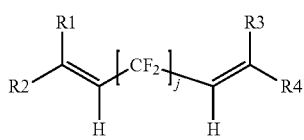

wherein j is an integer between 2 and 10, preferably between 4 and 8, and R1, R2, R3, R4, equal or different from each other, are H, F or $C_{1-5}$ alkyl or (per)fluoroalkyl group;

(OF-2)

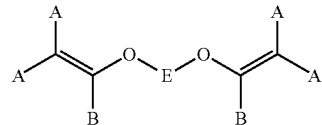

wherein each of A, equal or different from each other and at each occurrence, is independently selected from F, Cl, and H; each of B, equal or different from each other and at each occurrence, is independently selected from F, Cl, H and ORB, wherein RB is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF$—O—$(CF_2)_5$—O—$CF=CF_2$.

(OF-3)

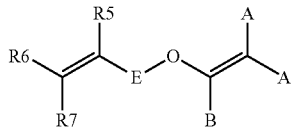

wherein E, A and B have the same meaning as above defined; R5, R6, R7, equal or different from each other, are H, F or $C_{1-5}$ alkyl or (per)fluoroalkyl group.

The weight ratio between polymer (a2) and elastomer (a1) is not particularly critical, provided that it is selected by routine experiments so as to deliver a continuous thermoplastic fluoropolymer phase and a dispersed vulcanized fluoroelastomer phase in the vulcanizate (C).

Generally the weight ratio polymer (a2)/elastomer (a1) will be comprised between 10/90 wt/wt to 70/30 wt/wt, preferably 20/80 to 40/60 wt/wt. The skilled in the art will select most appropriate weight ratio in view of target final properties of the vulcanizate (C).

Vulcanizate (C) can be prepared by dynamic curing of a mixture (M), said mixture comprising: i) at least one thermoplastic fluoropolymer [polymer (a2)], as above detailed;
ii) at least one fluoroelastomer [elastomer (a1)], as above detailed; and
iii) at least one curing system for the elastomer (a1).

For obtaining the vulcanizate (C), the mixture (M) is submitted to dynamic curing, according to the procedure disclosed for example in WO2015/014698 (SOLVAY SPECIALTY POLYMERS ITALY S.P:A:) May 5, 2015.

As a result, said elastomer (a1) is at least partially chemically crosslinked.

By the term "partially chemically crosslinked" used herein is meant that the elastomer (a1) is crosslinked to such an extent that it still retains elastomeric properties.

The Fluorinated Thermoplastic Elastomer [Polymer (F-TPE)]

For the purpose of the present invention, the term "elastomeric", when used in connection with the "block (b1)" is hereby intended to denote a polymer chain segment which, when taken alone, is substantially amorphous, that is to say, has a heat of fusion of less than 2.0 J/g, preferably of less than 1.5 J/g, more preferably of less than 1.0 J/g, as measured according to ASTM D3418.

For the purpose of the present invention, the term "thermoplastic", when used in connection with the "block (b2)", is hereby intended to denote a polymer chain segment which, when taken alone, is semi-crystalline, and possesses a detectable melting point, with an associated heat of fusion of exceeding 10.0 J/g, as measured according to ASTM D3418.

The F-TPE of the fluoropolymer composition (FC) of the invention is advantageously a block copolymer, said block copolymer typically having a structure comprising at least one block (b1) alternated to at least one block (b2), that is to say that said polymer F-TPE typically comprises, preferably consists of, one or more repeating structures of type (b2)-(b1)-(b2). Generally, the polymer (F-TPE) has a structure of type (b2)-(b1)-(b2), i.e. comprising a central block (b1) having two ends, connected at both ends to a side block (b2).

The block (b1) is often alternatively referred to as soft block (b1); the block (b2) is often alternatively referred to as hard block (b2).

The block (b1) is a VDF-based elastomeric block consisting of a sequence of recurring units, said sequence comprising recurring units derived from VDF and recurring units derived from at least one monomer (FM1), said monomer (FM1) having the same meaning as (FM) defined above.

Any of block(s) (b1) and (b2) may further comprise recurring units derived from at least one hydrogenated monomer, wherein the term "hydrogenated monomer" is intended to denote an ethylenically unsaturated monomer comprising at least one hydrogen atom and free from fluorine atoms.

The block (b1) may further comprise recurring units derived from at least one bis-olefin [bis-olefin (OF)] as above defined.

Should the block (b1) consists of a recurring units sequence further comprising recurring units derived from at least one bis-olefin (OF), said sequence typically comprises recurring units derived from the said at least one bis-olefin (OF) in an amount comprised between 0.01% and 1.0% by moles, preferably between 0.03% and 0.5% by moles, more preferably between 0.05% and 0.2% by moles, based on the total moles of recurring units of block (b1).

The block (b1) may further comprise recurring units derived from at least one hydrogenated monomer, which may be selected from the group consisting of $C_2$-$C_8$ non-fluorinated olefins such as ethylene, propylene or isobutylene, and may further comprise recurring units derived from at least one bis-olefin (OF), as above detailed.

The block (b1) typically consists of a sequence of recurring units comprising, preferably consisting of:
from 45% to 80% by moles of recurring units derived from VDF,
from 5% to 50% by moles of recurring units derived from at least one monomer (FM1),
optionally, up to 1.0% by moles of recurring units derived from at least one bis-olefin (OF), as above detailed; and
optionally, up to 30% by moles of recurring units derived from at least one hydrogenated monomer, with respect to the total moles of recurring units of the sequence of block (b1).

Advantageously, the block (b1) has a glass transition temperature of less than 25° C., as determined according to ASTM D3418.

Block (b2) consists of a sequence of recurring units derived from VDF wherein the crystallinity of said block (b2) and its weight fraction in the polymer (F-TPE) are such to provide for a heat of fusion ($\Delta Hf$) of the polymer (F-TPE) of at most 20 J/g, when determined according to ASTM D3418; and optionally, recurring units derived from one or more than one hydrogenated monomer, as above detailed, including notably ethylene, propylene, (meth)acrylic monomers, styrenic monomers.

More specifically, block (b2) consists of a sequence of recurring units derived from VDF and optionally from one or more than one additional fluorinated monomer different from VDF [monomer (F1)], e.g. HFP, TFE or CTFE, and optionally from a hydrogenated monomer, as above detailed, e.g. a (meth)acrylic monomer, whereas the amount of recurring units derived from VDF is of 85 to 100% moles, based on the total moles of recurring units of block (b2).

As non-limitative examples of block (b2) useful in the present invention, mention can be notably made of homopolymers of VDF, VDF/TFE copolymers, VDF/CTFE copolymers and the like.

VDF homopolymers are particularly advantageous for being used as block (b2) in the polymer (F-TPE).

The weight ratio between blocks (b1) and blocks (b2) in the fluorinated thermoplastic elastomer is typically comprised between 95:5 and 10:90.

According to certain preferred embodiments, the polymers (F-TPE) comprise a major amount of blocks (b1); according to these embodiment's, the polymer (F-TPE) used in the method of the present invention is characterized by a weight ratio between blocks (b1) and blocks (b2) of 95:5 to 65:35, preferably 90:10 to 70:30.

The weight fraction of block (b2) in the F-TPE and the molecular weight of the resulting F-TPE can be easily adapted to obtain the desired properties of the compositions.

Polymer (F-TPE) combines thermoplastic and elastomeric character, so as to possess a certain crystallinity, delivering a heat of fusion of at least 2.5 J/g, preferably at least 3.0 J/g.

The Fluoropolymer Composition (FC)

The amount of polymer (F-TPE) in the fluoropolymer composition (FC) is generally of at least 3% wt, preferably at least 5% wt more preferably of at least 10% wt and/or is advantageously of at most 50% wt, preferably at most 45% wt with respect to the total weight of fluoropolymer composition (FC).

The amount of vulcanizate (C) in the fluoropolymer composition (FC) is of at least 30% wt, preferably of at least 35% wt, more preferably at least 40% wt and/or is of at most 97% wt, preferably at most 90% wt, with respect to the total weight of fluoropolymer composition (FC).

According to certain embodiment's, the fluoropolymer composition (FC) comprises:
from 50 to 95% wt, preferably from 60 to 90% wt of vulcanizate (C), and
from 5 to 50% wt, preferably from 10 to 40% wt of polymer (F-TPE) wherein % wt is defined with respect to the total weight of vulcanizate (C) and polymer (F-TPE).

In one preferred embodiment of the present invention, the block (b2) and the thermoplastic VDF polymer (a2) have the same chemical composition.

Thus, according to said preferred embodiment, the present invention is directed to a fluoropolymer composition (FC) comprising:
- a thermoplastic vulcanizate fluorine-containing composition [vulcanizate (C)], comprising a continuous thermoplastic fluoropolymer phase and a dispersed vulcanized fluoroelastomer phase, said composition comprising:
  - a fluoroelastomer [elastomer (a1)] consisting of a sequence of recurring units, said sequence comprising recurring units derived from VDF and recurring units derived from at least one fluorinated monomer different from VDF, wherein at least part of said elastomer (a1) is chemically crosslinked; and
  - at least one thermoplastic VDF polymer [polymer (a2)] selected from the group consisting of homopolymers of VDF and copolymers VDF/TFE or VDF/CTFE comprising recurring units derived from VDF in an amount of at least 85% moles, with respect to the total moles of recurring units of polymer (a2), preferably being a homopolymer of VDF; and
- at least one fluorinated thermoplastic elastomer [polymer (F-TPE)] comprising:
  - at least one block (b1) consisting of a sequence of recurring units, said sequence comprising recurring units derived from VDF and recurring units derived from at least one fluorinated monomer different from VDF, and
  - at least one block (b2), selected from the group consisting of homopolymers of VDF, VDF/TFE copolymers, VDF/CTFE copolymers and the like, preferably being a homopolymer of VDF.

The fluoropolymer composition (FC) may further comprise, in addition to vulcanizate (C) and polymer (F-TPE), one or more additives, notably one or more additives selected from the group consisting of pigments, processing aids, plasticizers, stabilizers, mold release agents, and the like.

The invention further pertains to a method for manufacturing the fluoropolymer composition (FC) as above detailed.

The method advantageously generally includes at least one step of mixing vulcanizate (C) and polymer (F-TPE) in the molten state.

Mixing in the molten state can be effected using standard mixing devices; it is generally accomplished using extruder devices, with twin-screw extruders being preferred.

It is hence common practice of manufacturing the composition (FC) under the form of pellets.

In one embodiment of the present invention, the method includes: a first step of preparing and isolating the vulcanizate (C) in the form of pellets; a second step of melting the vulcanizate (C); a third step of adding the F-TPE, preferably in the form of powder, to the melted vulcanizate (C), followed by a fourth step of mixing the mixture thus obtained.

In an alternative embodiment of the present invention, F-TPE is added to the melted vulcanizate (C) after the completion of the dynamical vulcanization, at a temperature that is still above the melting temperature of all the crystalline phases in the composition.

The composition (FC) has improved mechanical properties, in particular recovery properties. Therefore, the composition (FC) of the present invention is suitably used in various fields including Automotive, Oil and Gas and Semicon Industry.

Composition (FC) can be used to make tubes, strips or filaments.

The composition (FC) of the present invention can be used as sealing material, e.g. in the chemical and semiconductor industries, and is suitable for fabricating O-rings, V-rings, gaskets and diaphragms.

In the electrical and wire/cable industries, composition (FC) can be used for wire coating and wire/cable sheathing due to their flexibility, low flammability and oil, fuel and chemical resistance.

The composition (FC) can also be moulded to provide a shaped part. Technique used for moulding is not particularly limited; standard techniques including shaping composition (FC) in a molten/softened form can be advantageously applied, and include notably compression moulding, extrusion moulding, injection moulding, transfer moulding and the like.

A method of making a shaped part, said method comprising moulding composition (FC), as above detailed, is yet another embodiment of the invention.

It is nevertheless generally understood that especially when said shaped part possesses a complex design, injection moulding technique is the most versatile, and extensively used.

In another embodiment of the present invention, a step of machining a standard shaped article made from composition (FC) so as to obtain said part having different size and shape from said standard shaped article can be used. Non limiting examples of said standard shaped articles include notably a plate, a rod, a slab and the like. Said standard shaped parts can be obtained by any processing technique, including notably extrusion or injection moulding of the polymer composition (FC).

Yet, especially when the target shaped part is a coated conductor wire or a bundle of conductor wires, composition (FC) may be shaped in the form of a sheath or a jacket through extrusion techniques.

Yet other objects of the present invention are shaped parts made from the composition (FC) of the present invention.

Should the disclosure of any patents, patent applications, and publications which are incorporated herein by reference conflict with the description of the present application to the extent that it may render a term unclear, the present description shall take precedence.

The invention will now be described with reference to the following examples, whose purpose is merely illustrative and not intended to limit the scope of the invention.

Raw Materials $(a1)_i$: Fluoroelastomer compound containing 100 parts by weight of a VDF/HFP copolymer having 66% fluorine content, 2 parts by weight of Bisphenol AF (CAS-No 1478-61-1) and 0.4 parts by weight of Benzyl(diethylamino)diphenylphosphonium chloride (CAS-No 82857-68-9), commercially available from Solvay Specialty Polymers.

$(a1)_i$: Fluoroelastomer compound containing 100 parts by weight of a VDF/HFP copolymer having 66% fluorine content, commercially available from Solvay Specialty Polymers.

$(a2)_i$: Standard homopolymer of VDF with low-medium viscosity and Tm=172° C., MFI (5 kg, 230° C.)=21 g/10 min, commercially available from Solvay Specialty Polymers as SOLEF® 1008.

TPE01: Thermoplastic elastomer having a fluoroelastomeric block (b1) (fluoroelastomer compound containing 100 parts by weight of a VDF/HFP copolymer having 66% fluorine content, commercially available from Solvay Specialty Polymers) linked at each chain end to a PVDF block (b2) (Standard homopolymer of VDF with low-medium viscosity and Tm=172° C., MFI (5 kg, 230° C.)=21 g/10 min, commercially available from Solvay Specialty Polymers as SOLEF® 1008). The ratio of fluoroelastomeric and PVDF block is 80/20 by weight. The melting point is 166° C.; MFI (5 kg, 230° C.)=28 g/10 min.

TPE02: Thermoplastic elastomer having a fluoroelastomeric block (b1) (fluoroelastomer compound containing 100 parts by weight of a VDF/HFP copolymer having 66% fluorine content, commercially available from Solvay Specialty Polymers) linked at each chain end to a PVDF block (b2) (Standard homopolymer of VDF with low-medium viscosity and Tm=172° C., MFI (5 kg, 230° C.)=21 g/10 min, commercially available from Solvay Specialty Polymers as SOLEF® 1008). The ratio of fluoroelastomeric and PVDF block is 90/10 by weight. Melting point=165° C.; MFI (5 kg, 230° C.)=21 g/10 min.

Example 1: Preparation of Thermoplastic Vulcanizate

Thermoplastic vulcanizate $(C)_a$ was prepared in a twin screws extruder Leistriz ZSE27HP-40D having a screw diameter of 27 mm and a length-to-diameter ratio of 40 and provided with two gravimetric feeders for feeding the fluorelastomer compound $(a1)_i$ and the thermoplastic polymer $(a2)_i$ into the extruder.

In the first feeder, a masterbatch composed of elastomer $(a1)_i$ and of a part of polymer $(a2)_i$ in a ratio 80:20 was charged.

The second feeder was used to feed a dry powder mixture composed of the remaining polymer $(a2)_i$, calcium hydroxide and magnesium oxide in a 7:2:1 ratio. The throughput of the two feeders was selected at 5 and 1 kg/h, respectively, to have a thermoplastic polymer/fluoroelastomer ratio of 30/70 in the vulcanizate.

The temperature of the different extrusion zones was set in a range from 140 to 230° C. The screw was operated at 60 rpm. The overall throughput was kept at about 6 kg/h.

The extrudate was cooled in water and then pelletized.

Example 2: Preparation of Fluoropolymer Composition

In an internal mixer, the temperature was set at 200° C. A quantity of thermoplastic vulcanizate $(C)_a$ prepared according to Example 1 was poured in the mixer and melted for 5 minutes at 30 rpm. Then TPE01 powder was added.

The mixture was blended for 20 minutes at 30 rpm using roller blades, recording the torque and the temperature. At the end of the test, the cell was opened; the product was extracted by cooling with compressed air.

The fluoropolymer composition was then grinded using liquid nitrogen and compression molded at 210° C. to prepare the specimens for tensile test, rheology and compression set.

The amounts of thermoplastic vulcanizate $(C)_a$ and of TPE01 used in the preparation of compositions 2a (Comparative), 2b, 2c and 2d are reported in Table 1.

TABLE 1

| Ex. | $(C)_a$ (g) | TPE01 (g) | TPE01(%) |
| --- | --- | --- | --- |
| 2a (Comp) | 60 | 0 | 0 |
| 2b | 54 | 6 | 10 |
| 2c | 48 | 12 | 20 |
| 2d | 36 | 24 | 40 |

The properties of the fluoropolymer composition prepared according to Example 2 are reported in Table 2:

TABLE 2

|  | 2a (Comp) | 2b | 2c | 2d |
| --- | --- | --- | --- | --- |
| $(C)_a$ (%) | 100 | 90 | 80 | 60 |
| TPE01(%) | 0 | 10 | 20 | 40 |
| M100 (MPa)* | 13.3 | 11.7 | 9.7 | 6.3 |
| STRS@br** | 25 | 19 | 14 | 6.3 |
| STN@br*** | 280 | 238 | 210 | 235 |
| Tension set (%) | 20 | 19 | 17 | 14 |
| Melt viscosity (Pa s) | 557490 | 448910 | 375460 | 169470 |

*M100 = 100% modulud is defined as the measured stress at 100% elongation, measured according to ASTM D638 type V at 50 mm/min.
**STRS@br = Stress at break
***STN@br = Strain at break M100, STRS@br and STN@br were measured according to ASTM D412.

The data in Table 2 show that the fluoropolymer compositions of the invention are characterized by a reduced melt viscosity, thus improving the processability of the compositions; at the same time, the compositions are able to deliver improved recovery in terms of lower tension set and show improved softness.

Example 3

Following the same procedure in Example 2, fluoropolymer composition were prepared using TPE02 or elastomer $(a1)_{ii}$ instead of TPE01.

The amounts of thermoplastic vulcanizate $(C)_a$, TPE02 and $(a1)_{ii}$ used in the preparation of compositions 3a (Comparative), 3b and 3c (Comparative), together with the Compression Set (%) for those blends are reported in Table 3:

TABLE 3

| Ex. | 3a (Comp) | 3b | 3c (Comp) |
| --- | --- | --- | --- |
| $(C)_a$ (%) | 100 | 80 | 80 |
| TPE02 (%) | 0 | 20 | 0 |
| (a1)ii | 0 | 0 | 20 |
| Compression Set (%) | 24 | 21 | 30 |

The data above clearly demonstrate that the fluoropolymer compositions of the invention are able to deliver improved recovery, lower Compression Set values and lower tension set in particular, thus resulting in improved sealing properties.

The same advantages are not obtained when a fluorinated elastomer $(a1)_{ii}$, which is non cross-linked and non crystallizable with the thermoplastic resin of the TPV, is added to the fluorinated thermoplastic vulcanizate.

The invention claimed is:
1. A fluoropolymer composition (FC) comprising:
a thermoplastic vulcanizate fluorine-containing composition [vulcanizate (C)], comprising a continuous thermoplastic fluoropolymer phase and a dispersed vulca- nized fluoroelastomer phase, said thermoplastic vulcanizate fluorine-containing composition comprising:
- a fluoroelastomer [elastomer (a1)] consisting of a sequence of recurring units, said sequence comprising recurring units derived from VDF and recurring units derived from at least one fluorinated monomer different from VDF [monomer (FM)], wherein at least part of said elastomer (a1) is chemically cross-linked; and
- at least one thermoplastic VDF polymer [polymer (a2)] comprising recurring units derived from VDF in an amount of at least 85% moles, with respect to the total moles of recurring units of polymer (a2); and
at least one fluorinated thermoplastic elastomer [polymer (F-TPE)] comprising:
- at least one elastomeric block (b1) consisting of a sequence of recurring units, said sequence comprising recurring units derived from VDF and recurring units derived from at least one fluorinated monomer different from VDF [monomer (FM1)], and
- at least one thermoplastic block (b2) consisting of a sequence of recurring units, said sequence comprising recurring units derived from VDF in an amount of at least 85% moles, with respect to the total moles of recurring units of block (b2).

2. The fluoropolymer composition (FC) of claim 1 wherein the amount of polymer (F-TPE) is of at least 3% wt with respect to the total weight of fluoropolymer composition (FC).

3. The fluoropolymer composition (FC) of claim 1 wherein the amount of vulcanizate (C) is of at least 30% wt with respect to the total weight of fluoropolymer composition (FC).

4. The fluoropolymer composition (FC) according to claim 1 which consists of:
- from 50 to 95 wt of vulcanizate (C), and
- from 5 to 50% wt of polymer (F-TPE) wherein % wt is defined with respect to the total weight of vulcanizate (C) and polymer (F-TPE).

5. The fluoropolymer composition (FC) according to claim 1 wherein the at least one monomer (FM) in elastomer (a1) is selected from the group consisting of the followings classes:
- (A1) $C_2$-$C_8$ perfluoroolefins
- (B1) hydrogen-containing $C_2$-$C_8$ olefins;
- (C1) $C_2$-$C_8$ chloro and/or bromo and/or iodo-fluoroolefins;
- (D1) (per)fluoroalkylvinylethers of formula $CF_2=CFOR_f$, wherein $R_f$ is a $C_1$-$C_6$ (per)fluoroalkyl group;
- (E1) (per)fluoro-oxy-alkylvinylethers of formula $CF_2=CFOX$, wherein X is a $C_1$-$C_{12}$ ((per)fluoro)-oxyalkyl comprising catenary oxygen atoms;
- (F1) (per)fluorodioxoles having formula:

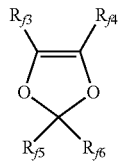

wherein $R_{f3}$, $R_{f4}$, $R_{f5}$, $R_{f6}$, equal or different from each other, are independently selected from among fluorine atoms and $C_1$-$C_6$ (per)fluoroalkyl groups, optionally comprising one or more than one oxygen atom;
- (G1) (per)fluoro-methoxy-vinylethers (MOVE, hereinafter) having formula:

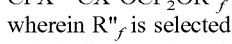
$CFX^2=CX^2OCF_2OR''_f$ wherein $R''_f$ is selected from among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X^2$ is F or H; and
- (H1) $C_2$-$C_8$ non-fluorinated olefins (O1).

6. The fluoropolymer composition (FC) according to claim 1 wherein polymer (a2) has a heat of fusion (ΔHf) of at least 25 J/g, when determined by DSC according to ASTM D3418.

7. The fluoropolymer composition (FC) according to claim 1 wherein polymer (a2) comprises recurring units derived from one or more than one fluorinated monomers [monomer (F)], selected from the group consisting of:
- (a) $C_2$-$C_8$ perfluoroolefins;
- (b) $C_2$-$C_8$ hydrogenated fluoroolefins;
- (c) perfluoroalkylethylenes complying with formula $CH_2=CH-R_{f0}$, in which $R_{f0}$ is a $C_1$-$C_6$ perfluoroalkyl;
- (d) chloro- and/or bromo- and/or iodo-$C_2$-$C_6$ fluoroolefins;
- (e) (per)fluoroalkylvinylethers complying with formula $CF_2=CFOR_{f1}$ in which $R_{f1}$ is a $C_1$-$C_6$ fluoro- or perfluoroalkyl;
- (f) $CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups;
- (g) (per)fluoroalkylvinylethers complying with formula $CF_2=CFOCF_2OR_{f2}$ in which $R_{f2}$ is a $C_1$-$C_6$ fluoro- or perfluoroalkyl or a $C_1$-$C_6$ (per)fluorooxyalkyl having one or more ether groups;
- (h) functional (per)fluoro-oxyalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;
- (i) fluorodioxoles, of formula (I):

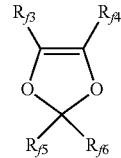

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom.

8. The fluoropolymer composition (FC) according to claim 1 wherein polymer (a2) is selected from the group consisting of a VDF homopolymer, a VDF/TFE copolymer and a VDF/CTFE copolymer.

9. The fluoropolymer composition (FC) according to claim 1 anyone of the preceding claims wherein the weight ratio between polymer (a2) and elastomer (a1) in vulcanizate (C) is comprised between 10/90 wt/wt to 70/30 wt/wt.

10. The fluoropolymer composition (FC) according to claim 1 wherein the block (b1) consists of a sequence of recurring units comprising:
from 45% to 80% by moles of recurring units derived from VDF,
from 5% to 50% by moles of recurring units derived from at least one monomer (FM1),
optionally, up to 1.0% by moles of recurring units derived from at least one bis-olefin (OF); and
optionally, up to 30% by moles of recurring units derived from at least one hydrogenated monomer, with respect to the total moles of recurring units of the sequence of block (b1), wherein the at least one monomer (FM1) is selected from the group consisting of the followings classes:
(A1) $C_2$-$C_8$ perfluoroolefins;
(B1) hydrogen-containing $C_2$-$C_8$ olefins;
(C1) $C_2$-$C_8$ chloro and/or bromo and/or iodo-fluoroolefins;
(D1) (per)fluoroalkylvinylethers of formula $CF_2=CFOR_f$, wherein $R_f$ is a $C_1$-$C_6$ (per)fluoroalkyl group;
(E1) (per)fluoro-oxy-alkylvinylethers of formula $CF_2=CFOX$, wherein X is a $C_1$-$C_{12}$ ((per)fluoro)-oxy-alkyl comprising catenary oxygen atoms;
(F1) (per)fluorodioxoles having formula:

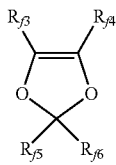

wherein $R_{f3}$, $R_{f4}$, $R_{f5}$, $R_{f6}$, equal or different from each other, are independently selected from fluorine atoms and $C_1$-$C_6$ (per)fluoroalkyl groups, optionally comprising one or more than one oxygen atom;
(G1) (per)fluoro-methoxy-vinylethers (MOVE, hereinafter) having formula:
$CFX^2=CX^2OCF_2OR''_f$
wherein $R''_f$ is selected from among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X^2$ is F or H; and
(H1) $C_2$-$C_8$ non-fluorinated olefins (O1).

11. The fluoropolymer composition (FC) according to claim 1 wherein block (b2) consists of a sequence of recurring units derived from VDF wherein the crystallinity of said block (b2) and its weight fraction in the polymer (F-TPE) are such to provide for a heat of fusion (ΔHf) of the polymer (F-TPE) of at most 20 J/g, when determined according to ASTM D3418; and
optionally, recurring units derived from one or more than one hydrogenated monomer.

12. The fluoropolymer composition (FC) according to claim 1 wherein block (b2) is selected from the group consisting of a VDF homopolymer, a VDF/TFE copolymer and a VDF/CTFE copolymer.

13. The fluoropolymer composition (FC) according to claim 1 wherein the weight ratio between blocks (b1) and blocks (b2) in the F-TPE is comprised between 95:5 and 10:90.

14. The fluoropolymer composition (FC) according to claim 1 wherein polymer (a2) and block (b2) are homopolymers of VDF.

15. A method for manufacturing the fluoropolymer composition (FC) of claim 1, said method including at least one step of mixing vulcanizate (C) and polymer (F-TPE) in the molten form.

16. An article comprising the composition (FC) according to claim 1.

17. A method of making a shaped part, said method comprising moulding at least one composition (FC), according to claim 1.

18. The fluoropolymer composition (FC) according to claim 4 which consists of:
from 60 to 90% wt of vulcanizate (C), and
from 10 to 40% wt of polymer (F-TPE)
wherein % wt is defined with respect to the total weight of vulcanizate (C) and polymer (F-TPE).

19. The fluoropolymer composition (FC) according to claim 9 wherein the weight ratio between polymer (a2) and elastomer (a1) in vulcanizate (C) is comprised between 20/80 to 40/60 wt/wt.

20. The fluoropolymer composition (FC) according to claim 10 wherein the block (b 1) consists of a sequence of recurring units consisting of:
from 45% to 80% by moles of recurring units derived from VDF,
from 5% to 50% by moles of recurring units derived from at least one monomer (FM1),
optionally, up to 1.0% by moles of recurring units derived from at least one bis-olefin (OF); and
optionally, up to 30% by moles of recurring units derived from at least one hydrogenated monomer, with respect to the total moles of recurring units of the sequence of block (b1).

* * * * *